United States Patent [19]

Jacob

[11] 4,177,686
[45] Dec. 11, 1979

[54] ENDLESS POWER TRANSMISSION BELT

[75] Inventor: Richard J. Jacob, Dayton, Ohio

[73] Assignee: Dayco Corporation, Dayton, Ohio

[21] Appl. No.: 916,026

[22] Filed: Jun. 15, 1978

[51] Int. Cl.² .............................................. G01F 1/06
[52] U.S. Cl. ................................................ 74/231 CB
[58] Field of Search ..................... 74/234, 233, 231 R, 74/238, 231 CB, 231 P, 237; 198/242; 156/142, 138, 140, 240

[56] References Cited

U.S. PATENT DOCUMENTS

| 2,423,579 | 7/1947 | Buren | 74/231 CB |
| 3,987,684 | 10/1976 | Fisher | 74/231 P |

Primary Examiner—Doris L. Troutman
Attorney, Agent, or Firm—Reuben Wolk

[57] ABSTRACT

An endless power transmission belt having a compression section, a load-carrying section and a tension section comprising a plurality of transverse corrugations molded therein to provide a cool running belt.

26 Claims, 5 Drawing Figures

ENDLESS POWER TRANSMISSION BELT

BACKGROUND OF THE INVENTION

This invention relates to endless V-type power transmission belts.

Endless power transmission belts made primarily of elastomeric materials and including toothed or cogged compression sections, are in wide use throughout industry. It is a problem with all of such belts to provide sufficient rigidity transverse of the endless path in which it operates, in order to prevent belt turnover, while enabling the belt to be operated in sheaves or pulleys of minimum diameters.

Many belt constructions have been proposed heretofore for increasing the transverse rigidity of conventional as well as tooth V-belts; however, these previously proposed constructions often result in a belt which is more expensive or which has a greater thickness than necessary. It has been found that thicker belts are more difficult to operate in comparatively small diameter sheaves or pulleys and also causes the belt to operate at an elevated temperature which tends to promote delamination of the various belt sections and to reduce service life.

SUMMARY

In accordance with the present invention, a cooler running V-type endless power transmission belt is provided.

In particular, this invention provides an endless V-type power transmission belt made primarily of elastomeric materials and comprising a tension section, a load-carrying section and a compression section wherein the tension section comprises a plurality of grooves molded in the outer surface thereof, the grooves being transverse of the endless path of the belt.

It is, therefore, an object of the present invention to provide a cooler running V-type endless power transmission belt.

Other objects, aspects, and several advantages of the present invention will be apparent to those skilled in the art from a reading of the detailed specification, the accompanying drawing and the appended claims.

DESCRIPTION OF THE PREFERRED EMBODIMENT

Figure 1:
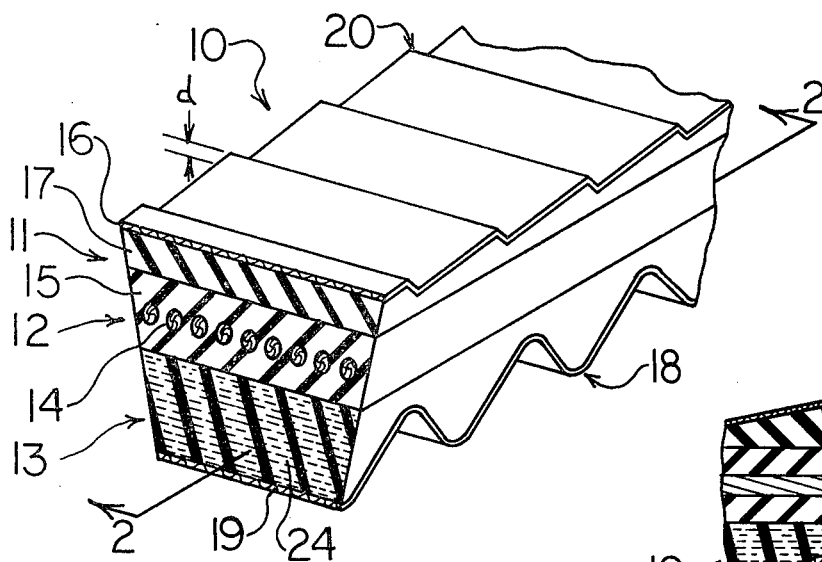
FIG. 1 is a perspective view of a segment of the belt of this invention.

Referring now to the drawing, the endless power transmission belt of this invention is designated generally by the reference number 10. Belt 10, as shown is in the form of a toothed or so-called cog-type belt and comprises a top or outer tension section 11, a load-carrying section 12, and a bottom or inner compression section 13. The load-carrying section 12 has a helically-wound load-carrying cord 14 embedded in a tough rubber compound 15. The load-carrying section 12 is bounded on the bottom by the compression section 13 composed of a stiff, fiber-loaded rubber cushion compounded to provide transverse stiffness in the belt; and on the top by the tension section 11 composed of at least one layer of rubber-impregnated fabric 16 and a layer of rubber 17.

The compression section 13 has a plurality of teeth, each designated generally by the reference numeral 18 which are arranged transverse the longitudinal or endless path of the belt 10. The inner surface of each tooth 18 has a rubber-impregnated fabric layer 19, although this layer may be omitted. The compression section 13 is made of any suitable rubber material, and in the embodiment shown, contains a plurality of discrete fibers 24 which are oriented transverse to the endless path of belt 10. These fibers may be of any suitable fibrous material. These fibers may be omitted, if desired.

The tension section 11 has a plurality of saw-tooth corrugations, each designated generally by the reference number 20, which are arranged transverse the endless path of the belt 10. The depth of each corrugation 20 ranges from about 25 to about 75 percent, preferably about 50 percent of the total thickness of the tension section 11. In general, the number of layers of rubber-impregnated fabric 16 which comprise the tension section 11 can range from 1 to 10; however, it is presently preferred that the number of such layers 16 range from 2 to 8. The rubber-impregnated fabric which constitute the layers 16 and the inner covering 19 can all be the same, or may be formed of various combinations of different type of fabric. For example, the fabric may be square-woven, bias laid; "stress-relieved", which means that the warps and wefts are at an angle of 95° to 155° with each other; or are so-called tire cord fabrics which utilizes a transverse strength cord and a longitudinal weak tire cord.

Figure 2:
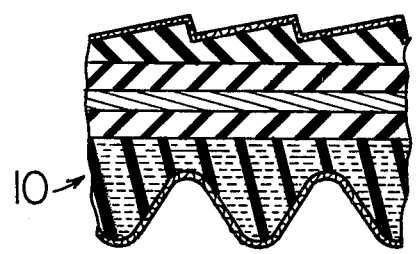
FIG. 2 is a sectional view of the belt segment, taken along lines 2—2 of FIG. 1.
Figure 3:
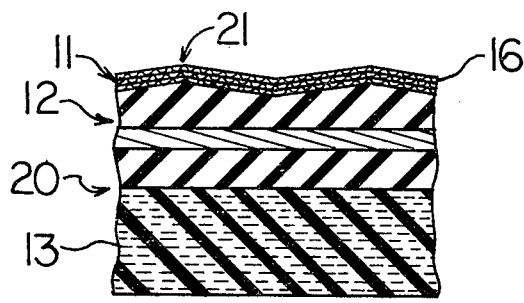
FIG. 3 is a sectional view of another embodiment of the belt of this invention similar to FIG. 2.

FIG. 3 illustrates another embodiment of the present invention wherein the compression section 13 is plain, i.e., section 13 is not grooved or toothed. The belt shown in FIG. 3 is designated by the reference numeral 20 and further differs from the belt 10 shown in FIGS. 1 and 2 in that the tension section 11 has a plurality of triangular corrugations, each designated generally by the reference numeral 21, which are arranged transverse to the endless path of the belt 20. The depth of each corrugation 21 ranges from about 25 to about 50 percent, preferably about 30 percent of the total thickness of the tension section 11. The belt 20 also differs from the belt 10 in that the tension section 11 is comprised solely of layers of fabric 16, the rubber layer 17 being optional.

It should be noted that although this embodiment does not illustrate an inner fabric layer similar to layer 19, such a layer may also be included if desired.

The belt of the invention is fabricated by first forming a belt sleeve designated by reference numeral 22 which is formed in a fairly conventional manner by assembling components of the sleeve around a cylindrical forming member or mandrel 23. In order to form the belt described above, with respect to FIGS. 1 and 2, the sleeve is assembled, as will be described, vulcanized, and cut into the individual belts generally designated by the reference numeral 10.

Figure 4:
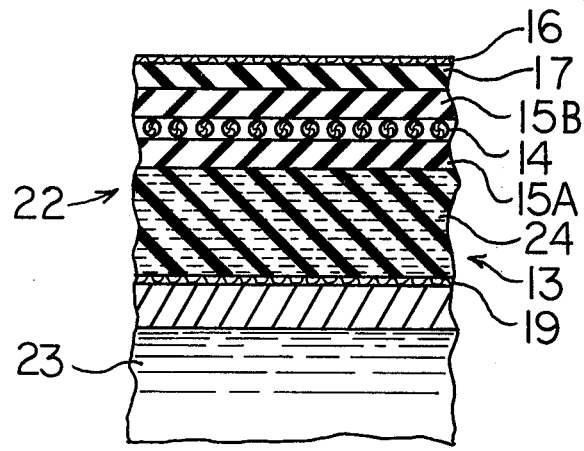
FIG. 4 is a sectional view of the assembly of the components of the belt sleeve.

FIG. 4 illustrates an assembly whereby a first layer 19 of rubber-impregnated fabric, placed around the mandrel 23, and this is followed by a layer of rubber 13 which is concentrically applied thereto. Thus the fabric 19 and the rubber layer 13 comprise the compression section of the finished belt. As noted above, the compression section may include fibers, generally designed by reference numeral 24 to produce the belt illustrated in FIG. 1. However, the use of this fibrous reinforcement is optional and in addition, the use of the fabric layer 19 is also optional, as a satisfactory compression section may be formed of the rubber layer 13 alone.

The load-carrying section generally designed by reference numeral 12 is illustrated as being formed by a first layer of rubber 15A around which is applied a continuous strength cord 14 which is placed at right angles to the mandrel in a conventional manner, such as described in U.S. Pat. No. 3,464,875. This is surmounted by a similar layer 15B. The layers 15A and 15B are preferably formed of a tough rubber compound so that they form a cushion for the helical cord, and collectively form the cushion 15. It is also possible to omit the cushion layer and to apply the cord 14 directly around the compression layer 13.

Surmounting the load-carrying section are a layer of rubber 17 and at least one layer of fabric designated by reference number 16 which form the tension section 11. The layer or layers 14 may be either separately or continuously wrapped around the load-carrying section so that anywhere from 1 to 10 layers are provided, as indicated above. As previously discussed, each of these layers may be made of a fabric which is bias laid square-woven, stress relieved, or tire cord fabric. Further, the rubber layer 17 may be omitted, forming the tension section 11 entirely of layers of fabric 16.

Figure 5:
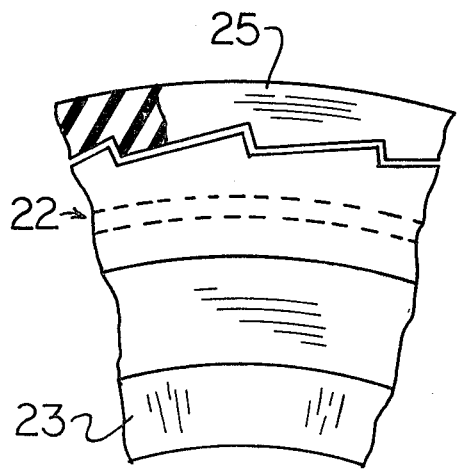
FIG. 5 is a sectional view illustrating a further step in manufacturing the belt sleeve.

Upon completion of the above assembly an outer cylindrical forming member is placed around the assembly, this forming member having corrugations at its inner surface to form corresponding corrugations in the tension section at right angles to the load-carrying member. This is illustrated in FIG. 5 in which the belt sleeve, or assembly 22, is illustrated without reference to the details of FIG. 4, and the outer forming member 25, which is preferably a reusable rubber matrix is illustrated in a fragmentary manner. Other types of forming members may be used to accomplish the same purpose, namely to create the corrugations in the outer or tension section of the belt sleeve. The entire assembly is then vulcanized in a conventional manner, such as shown, for example, in U.S. Pat. Nos. 2,268,865 or 3,398,218, which results in curing the entire sleeve and in completing the formation of the corrugations in the fabric layers which make up the tension section. The sleeve is then removed and cut into individual belt bodies in a manner well known in the prior art.

The above process which is described and illustrated will result in a belt having a smooth inner surface as shown in FIG. 3, for example, but in order to provide the cogs, or inner corrugations as shown in FIGS. 1 and 2, it is only necessary to make the mandrel 23 in a corrugated shape as shown, for example, in the above-mentioned U.S. Pat. No. 3,464,875. It is also possible to utilize an inner rubber matrix similar to the matrix 25 for this purpose if desired. The vulcanizing and cutting steps for this type belt, of course, are identical to those previously described.

The term "rubber" as used herein, and in the claims, is intended to include rubber compositions comprising natural rubber, synthetic rubber and mixtures thereof, as is well known in the art.

It will be apparent to those skilled in the art that various changes and modifications may be made in the above procedure without departing from the spirit or scope of the invention.

I claim:

1. An endless power transmission belt comprising an inner compression section, an outer tension section and a load-carrying section positioned therebetween, said tension section comprising a plurality of corrugations transverse to the endless path of said belt, said corrugations having a sawtooth shape when viewed from a side of said belt.

2. The belt of claim 1 wherein said compression section comprises a fiber-loaded rubber compound, the fibers in said compound being oriented in a direction generally transverse to the endless path of said belt.

3. The belt of claim 1 wherein said load-carrying section comprises a helically-wound continuous cord embedded in a rubber compound.

4. The belt of claim 1 wherein said tension section comprises a layer of a rubber compound adjacent to said load-carrying section and at least one layer of fabric located outwardly of said tension rubber layer.

5. The belt of claim 4 wherein the number of said fabric layers ranges from 1 to 10.

6. The belt of claim 4 wherein the number of said fabric layers ranges from 2 to 8.

7. The belt of claim 1 wherein the depth of said corrugations in said tension section ranges from about 25 to about 75 percent of the total thickness of said tension section.

8. The belt of claim 1 wherein the depth of said corrugations in said tension section is about 50 percent of the total thickness of said tension section.

9. The belt of claim 6 wherein at least two of the layers of said fabric generally follow the same convolutions.

10. The belt of claim 1 wherein said compression section has transverse cogs formed therein.

11. The belt of claim 1 wherein the inner surface of said compression section is formed by at least one layer of fabric.

12. The belt of claim 1 wherein the outer surface of said tension section is formed by at least one layer of fabric and wherein the inner surface of said compression section is formed by at least one layer of fabric.

13. The belt of claim 12 wherein one or more of said fabric layers is selected from the group consisting of square-woven bias laid fabric, stress-relieved fabric, and tire cord fabric.

14. An endless power transmission belt comprising an inner compression section, an outer tension section and a load-carrying section positioned therebetween, said tension section comprising a plurality of corrugations transverse to the endless path of said belt, said corrugations comprising a series of inverted V-shaped ridges when viewed from a side of said belt.

15. The belt of claim 14 wherein said compression section comprises a fiber-loaded rubber compound, the fibers in said compound being oriented in a direction generally transverse to the endless path of said belt.

16. The belt of claim 14 wherein said load-carrying section comprises a helically-wound continuous cord embedded in a rubber compound.

17. The belt of claim 14 wherein said tension section comprises a layer of a rubber compound adjacent to said load-carrying section and at least one layer of fabric located outwardly of said tension rubber layer.

18. The belt of claim 17 wherein the number of said fabric layers ranges from 1 to 10.

19. The belt of claim 17 wherein the number of said fabric layers ranges from 2 to 8.

20. The belt of claim 14 wherein the depth of said corrugations in said tension section ranges from about 25 to about 75 percent of the total thickness of said tension section.

21. The belt of claim 14 wherein the depth of said corrugations in said tension section is about 50 percent of the total thickness of said tension section.

22. The belt of claim 19 wherein at least two of the layers of said fabric generally follow the same convolutions.

23. The belt of claim 14 wherein said compression section has transverse cogs formed therein.

24. The belt of claim 14 wherein the inner surface of said compression section is formed by at least one layer of fabric.

25. The belt of claim 14 wherein the outer surface of said tension section is formed by at least one layer of fabric and wherein the inner surface of said compression section is formed by at least one layer of fabric.

26. The belt of claim 25 wherein one or more of said fabric layers is selected from the group consisting of square-woven bias laid fabric, stress-relieved fabric, and tire cord fabric.

* * * * *